(12) United States Patent
Omiya

(10) Patent No.: US 8,411,838 B2
(45) Date of Patent: Apr. 2, 2013

(54) CALL AMOUNT ESTIMATING METHOD

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 903 days.

(21) Appl. No.: 12/524,277

(22) PCT Filed: Jan. 25, 2008

(86) PCT No.: PCT/JP2008/051048
§ 371 (c)(1),
(2), (4) Date: Jul. 23, 2009

(87) PCT Pub. No.: WO2008/093602
PCT Pub. Date: Aug. 7, 2008

(65) Prior Publication Data
US 2009/0290700 A1 Nov. 26, 2009

(30) Foreign Application Priority Data
Jan. 30, 2007 (JP) .................... 2007-019189

(51) Int. Cl.
*H04M 3/00* (2006.01)
*H04M 5/00* (2006.01)
*G06Q 10/00* (2012.01)
(52) U.S. Cl. ............... 379/265.01; 379/265.1; 705/7.13
(58) Field of Classification Search ............. 379/201.02, 379/265.01, 265.1; 705/7.11, 7.12, 7.13, 705/7.17, 7.31
See application file for complete search history.

(56) References Cited

U.S. PATENT DOCUMENTS

| 6,963,826 B2 * | 11/2005 | Hanaman et al. ............... 703/2 |
| 7,539,627 B2 * | 5/2009 | Schmidt ...................... 705/7.16 |
| 2005/0065837 A1 * | 3/2005 | Kosiba et al. .................. 705/9 |
| 2008/0004933 A1 * | 1/2008 | Gillespie ......................... 705/9 |
| 2008/0300963 A1 * | 12/2008 | Seetharaman et al. ......... 705/10 |

FOREIGN PATENT DOCUMENTS
JP 2006-254094 9/2006

OTHER PUBLICATIONS

Yoji Takeuchi, "CTI System-ka Giho vol. 7 Call Center Un'yo no Kaname to naru Workforce Management no Katsuyo", Computer Telephony, Jul. 20, 1999, vol. 2, No. 7, p. 74.
International Search Report for International Application No. PCT/JP2008/051048.

* cited by examiner

*Primary Examiner* — Ahmad Matar
*Assistant Examiner* — Nafiz E Hoque
(74) *Attorney, Agent, or Firm* — Hoffmann & Baron, LLP

(57) ABSTRACT

A management server 10 stores past record data regarding the call volume by collecting from an exchanger, classifies the past record data in accordance with segments: a 7-day period in a month starting from the beginning of a month; a day of the week; and a predetermined period of time in a day, for a predetermined term in the past, obtains a multiple regression equation having the call volume as an objective variable, based upon the past record data thus classified, by performing a multivariate analysis for each day of the week, and calculates the call volume in a term that is specified by a user based upon the multiple regression equation.

12 Claims, 15 Drawing Sheets

FIG. 3

```
SUN MON TUE WED THU FRI SAT
                      1   2   3     — 61a
  4   5   6   7   8   9  10        — 62a
 11  12  13  14  15  16  17        — 63a
              ⋮
```

FIG. 4

```
SUN MON TUE WED THU FRI SAT
                      1   2   3     — 61b
  4   5   6   7   8   9  10        — 62b
 11  12  13  14  15  16  17
              ⋮
```

FIG. 5

```
SUN MON TUE WED THU FRI SAT
                              1
  2   3   4   5   6   7   8
  9  10  11  12  13  14  15
 16 (17) 18  19  20  21  22
 23  24  25  26  27  28  29
 30  31
```

FIG. 9

EVENT TABLE

| ID | NAME | RATE OF INCREASE | RATE OF DECREASE |
|---|---|---|---|
| 0001 | ADVERTISEMENT IN XX JOURNAL | 140% | TYPE 5 |
| ... | ... | ... | ... |

FIG. 10

EVENT OCCURRENCE TABLE

| ID | YEAR-MONTH-DAY | MAGNITUDE |
|---|---|---|
| 0001 | 2007/01/09 | 100% |
| 0001 | 2007/02/16 | 95% |
| ... | ... | ... |

FIG. 11

EVENT REGISTRATION

TARGET QUEUE: NEW APPLICANT

| JANUARY 2007 |
|---|
| MON | TUE | WED | THU | FRI | SAT | SUN |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

| FEBRUARY 2007 |
|---|
| MON | TUE | WED | THU | FRI | SAT | SUN |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | | | | |

| MARCH 2007 |
|---|
| MON | TUE | WED | THU | FRI | SAT | SUN |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | |

( NEW EVENT REGISTRATION )

| | YEAR-MONTH-DAY | EVENT NAME | SCALE OF EVENT | EFFECT LEVEL (%) | COLOR |
|---|---|---|---|---|---|
| CORRECT DELETE | 2007/01/09 | ADVERTISEMENT IN XX JOURNAL | | 100% | |
| CORRECT DELETE | 2007/02/16 | ADVERTISEMENT IN XX JOURNAL | | 95% | |
| CORRECT DELETE | 2007/02/23 | INCREASE IN INTEREST RATE | | 110% | |
| CORRECT DELETE | 2007/03/23 | ADVERTISEMENT IN YY JOURNAL AND ZZ JOURNAL | | 110% | |

FIG. 12

EVENT REGISTRATION

TARGET QUEUE: NEW APPLICANT ▽

| JANUARY 2007 |
|---|
| MON | TUE | WED | THU | FRI | SAT | SUN |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

| FEBRUARY 2007 |
|---|
| MON | TUE | WED | THU | FRI | SAT | SUN |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | | | | |

| MARCH 2007 |
|---|
| MON | TUE | WED | THU | FRI | SAT | SUN |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | |

NEW EVENT REGISTRATION

DAY OF EVENT (YEAR-MONTH-DAY): 2007 ▽ YEAR 1 ▽ MONTH 9 ▽

EVENT: ADVERTISEMENT IN XX JOURNAL ▽

SCALE OF EVENT (CIRCULATION ETC.): [    ]

EFFECT LEVEL (%): 100 %

RATE OF DECREASE (%):

| 1ST DAY | 2ND DAY | 3RD DAY | 4TH DAY | 5TH DAY | 6TH DAY | 7TH DAY | 8TH DAY | 9TH DAY | 10TH DAY |
|---|---|---|---|---|---|---|---|---|---|
| 90 | 80 | 70 | 60 | 50 | 40 | 30 | 20 | 10 | 0 |

FIG. 14

EXAMPLE 1

| ITEM | CATEGORY |
|---|---|
| WEEK | 1 |
| | 2 |
| | 3 |
| | 4 |
| | 5 |
| TIME PERIOD | 00:00 – |
| | 01:00 – |
| | 02:00 – |
| | 03:00 – |
| | ... |
| | 20:00 – |
| | 21:00 – |
| | 22:00 – |
| | 23:00 – |

EXECUTED FOR EACH DAY OF THE WEEK IN CONSIDERATION OF HOLIDAYS

COMPARATIVE EXAMPLE 1

| ITEM | CATEGORY |
|---|---|
| WEEK | 1 |
| | 2 |
| | 3 |
| | 4 |
| | 5 |
| DAY OF THE WEEK | THU |
| | FRI |
| | SAT |
| | SUN/HOLIDAY |
| | MON/DAY AFTER HOLIDAY |
| | TUE |
| | WED |
| TIME PERIOD | 00:00 – |
| | 01:00 – |
| | 02:00 – |
| | 03:00 – |
| | ... |
| | 20:00 – |
| | 21:00 – |
| | 22:00 – |
| | 23:00 – |

COMPARATIVE EXAMPLE 2

| ITEM | CATEGORY |
|---|---|
| DAY | 1ST |
| | 2ND |
| | 3RD |
| | 4TH |
| | ... |
| | 28TH |
| | 29TH |
| | 30TH |
| | 31ST |
| DAY OF THE WEEK | THU |
| | FRI |
| | SAT |
| | SUN/HOLIDAY |
| | MON/DAY AFTER HOLIDAY |
| | TUE |
| | WED |
| TIME PERIOD | 00:00 – |
| | 01:00 – |
| | 02:00 – |
| | 03:00 – |
| | ... |
| | 20:00 – |
| | 21:00 – |
| | 22:00 – |
| | 23:00 – |

COMPARATIVE EXAMPLE 3

| ITEM | CATEGORY |
|---|---|
| DAY | 1ST |
| | 2ND |
| | 3RD |
| | 4TH |
| | ... |
| | 28TH |
| | 29TH |
| | 30TH |
| | 31ST |
| DAY OF THE WEEK | THU |
| | FRI |
| | SAT |
| | SUN |
| | MON |
| | TUE |
| | WED |
| TIME PERIOD | 00:00 – |
| | 01:00 – |
| | 02:00 – |
| | 03:00 – |
| | ... |
| | 20:00 – |
| | 21:00 – |
| | 22:00 – |
| | 23:00 – |

COMPARATIVE EXAMPLE 4

| ITEM | CATEGORY |
|---|---|
| DAY OF THE WEEK | WEEKDAYS |
| | MON/DAY AFTER HOLIDAY |
| | SAT |
| | SUN/HOLIDAY |
| DOES DAY END IN 5 OR 0? | YES |
| | NO |
| TIME PERIOD | 00:00 – |
| | 01:00 – |
| | 02:00 – |
| | 03:00 – |
| | ... |
| | 20:00 – |
| | 21:00 – |
| | 22:00 – |
| | 23:00 – |

FIG. 16
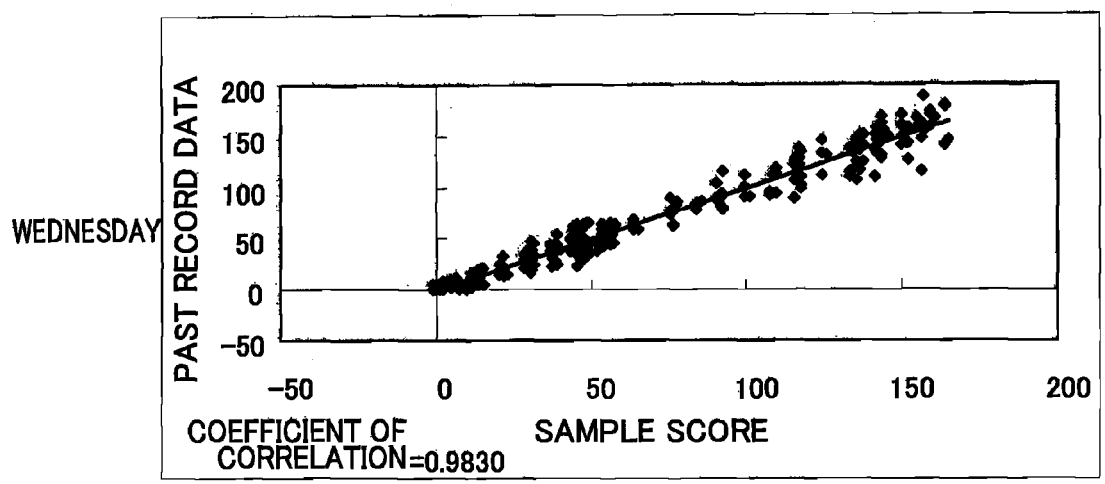
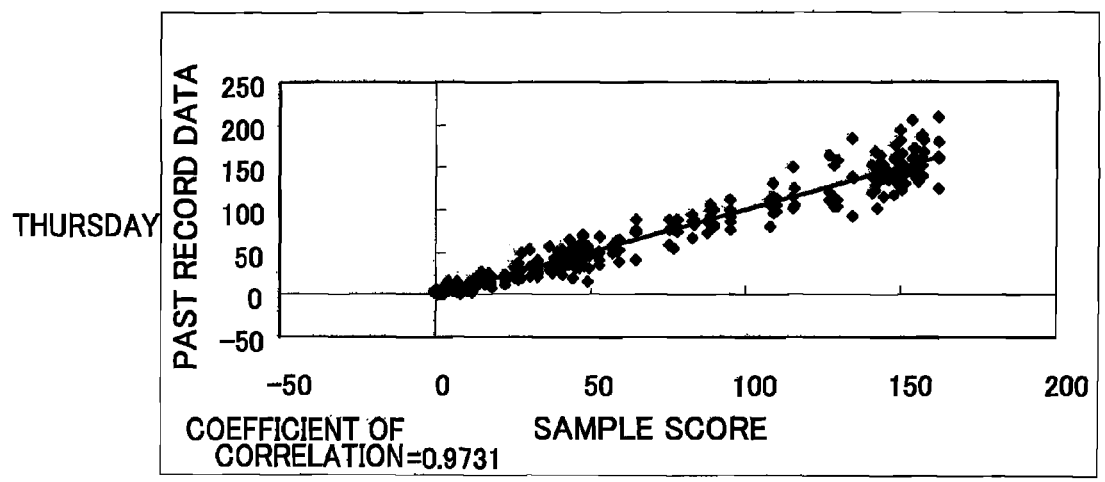

COMPARATIVE EXAMPLE 1

COMPARATIVE EXAMPLE 2

COMPARATIVE EXAMPLE 3

COMPARATIVE EXAMPLE 4

CALL AMOUNT ESTIMATING METHOD

CROSS-REFERENCE TO RELATED APPLICATIONS

This application is the National Stage of International Application No. PCT/JP2008/051048, which designates the U.S., filed Jan. 25, 2008 which claims the benefit of JP 2007-019189, filed Jan. 30, 2007, the contents of which are incorporated by reference herein.

TECHNICAL FIELD

The present invention relates to a method, server and program for predicting future call volume in a contact center.

BACKGROUND ART

In recent years, demand for a contact center that specializes in handling calls from customers has been increasing among business organizations. In order to accommodate large call volume, the number of operators needs to be increased; however, increasing the number of operators blindly leads to an increase in cost. Given this, a system for allocating an appropriate number of operators with respect to call volume has been used that requires a prediction of call volume as an integral part.

Under the circumstances, a prediction method of future call volume based upon past record is being proposed. For example, Patent Document 1 discloses a method for correcting the number of incoming calls in consideration of redialing, and an example of prediction using a regression analysis.

Patent Document 1: Japanese Unexamined Patent Application Publication No. 2006-254094

DISCLOSURE OF THE INVENTION

Problems to be Solved by the Invention

However, although a prediction formula, using an explaining variable such as first week and the like, is exemplified in the prediction method of Patent Document 1, the method is not necessarily a valid method for providing a highly accurate prediction. Consequently, a highly accurate and effective prediction formula is desired. In other words, since prediction accuracy is preferably as high as possible in order to appropriately allocate operators in accordance with call volume, if a combination of explaining variables with high prediction accuracy can be used, a valuable and valid call volume prediction method can be provided.

In addition, call volume may increase and decrease not only periodically, for example every day of the week, but also by various events. If a degree of effect of such an external factor can be registered in advance, a prediction with higher accuracy is possible.

Given this, the present invention aims at providing a method, server and program for predicting call volume by a multivariate analysis using an explaining variable with high prediction accuracy, and a method, server and program for adjusting the call volume thus predicted in consideration of an effect of an event that causes an increase or a decrease in call volume.

Means for Solving the Problems

More specifically, the present invention provides the following to this end.

In a first aspect of the present invention, a method for predicting future call volume in a contact center includes steps of:

storing past record data regarding the call volume by collecting from an exchanger;

classifying the past record data for a predetermined term in the past in accordance with segments: a 7-day period in a month starting from the beginning of a month; a day of the week, and a predetermined period of time in a day;

obtaining a multiple regression equation having the call volume as an objective variable, based upon the past record data thus classified, by performing a multivariate analysis for each day of the week; and calculating the call volume in a term that is specified by a user based upon the multiple regression equation.

In such a configuration, a server executing the method stores past record data regarding the call volume by collecting from an exchanger, classifies the past record data for a predetermined term in the past in accordance with segments: a 7-day period in a month starting from the beginning of a month; a day of the week; and a predetermined period of time in a day, obtains a multiple regression equation having the call volume as an objective variable, based upon the past record data thus classified, by performing a multivariate analysis for each day of the week, and calculates the call volume in a term that is specified by a user based upon the multiple regression equation.

Thus, the server performs the multivariate analysis using week and time period, for each day of the week based upon the past record data of call volume. Since these variables have a significant impact on call volume, a multiple regression equation having these variables as explaining variables is valid for a prediction of call volume.

According to a second aspect of the present invention, in the step of classifying in the method as described in the first aspect, a first day after a holiday and Mondays are classified in the same segment and public holidays and Sundays are classified in the same segment.

According to such a configuration, the server executing the method classifies a first day after a holiday and Mondays in the same segment and public holidays and Sundays in the same segment. Thus, past record data for holidays other than Sundays and the days after a holiday can be collected as data of a more appropriate segment than in a case of classifying as weekdays.

According to a third aspect of the present invention, the method as described in the first or the second aspect further includes steps of: accepting from a user an input of a rate of increase of the call volume and a rate of decrease in effect thereof on the call volume, in association with a date of the event, for an event that causes an increase or a decrease in the call volume; and adjusting the call volume that is calculated, based upon the rate of increase and the rate of decrease thus accepted.

According to such a configuration, the server executing the method, accepts from a user an input of a rate of increase of the call volume and a rate of decrease in effect thereof on the call volume, in association with a date of the event, for an event that causes an increase or a decrease in the call volume, and adjusts the call volume that is calculated, based upon the rate of increase and the rate of decrease thus accepted.

Thus, a user can register in advance an event that causes an increase or a decrease in call volume, and the server can adjust the call volume that is predicted based upon a rate of increase in call volume by the event thus registered and a rate of decrease in effect.

As a result, according to the method, in addition to periodical fluctuation of every day of the week, every week, every time period and the like, a fluctuation in call volume by the event can be considered, thereby providing a more accurate prediction.

According to a fourth aspect of the present invention, the method as described in the third aspect further includes steps of: accepting from a user an input of magnitude data that indicates a magnitude of the event, in association with identification data of the event; and adjusting the rate of increase based upon the magnitude data thus accepted.

According to such a configuration, the server executing the method accepts from a user an input of magnitude data that indicates a magnitude of the event, in association with identification data of the event, and adjusts the rate of increase based upon the magnitude data thus accepted.

Thus, the server can adjust the rate of increase, which is registered in advance, by the magnitude of similar events (for example, a circulation in a newspaper and the like). As a result, in a case where a similar event is repeated, a user can obtain a prediction of call volume by inputting the magnitude thereof.

According to a fifth aspect of the present invention, the method as described in the third or fourth aspect further includes a step of calculating the rate of increase and the rate of decrease based upon a past record of the event.

According to such a configuration, the server executing the method calculates the rate of increase and the rate of decrease based upon a past record of the event. Thus, by collecting past record data without a user's input, a reliable rate of increase and a rate of decrease in effect to the call volume can be obtained.

According to a sixth aspect of the present invention, in the step of accepting an input regarding the event in the method as described in any one of the third to the fifth aspects, in a case where a plurality of events overlap on the same day, a combination of the plurality of events is accepted as a single event.

According to such a configuration, the server executing the method accepts a combination of a plurality of the events on the same day (for example, in a case where an advertisement appears in two newspapers) as a single event.

In a case where a plurality of events overlaps, the events influence each other and the effect to call volume is not simply a sum thereof. Therefore, since the method allows a combination of a plurality of events to be newly registered as a single event, call volume may be predicted without deteriorating the accuracy thereof.

In a seventh aspect of the present invention, a server for predicting future call volume in a contact center includes:

a unit configured to store past record data regarding the call volume by collecting from an exchanger;

a unit configured to classify the past record data for a predetermined term in the past in accordance with segments: a 7-day period in a month starting from the beginning of a month; a day of the week; and a predetermined period of time in a day;

a unit configured to obtain a multiple regression equation having the call volume as an objective variable, based upon the past record data thus classified, by performing a multivariate analysis for each day of the week; and a unit configured to calculate the call volume in a term that is specified by a user based upon the multiple regression equation.

According to such a configuration, by operating the server, an effect similar to that described in the first aspect can be expected.

According to an eighth aspect of the present invention, in the server as described in the seventh aspect, the classification unit classifies a first day after a holiday and Mondays in the same segment and public holidays and Sundays in the same segment.

According to such a configuration, by operating the server, an effect similar to that described in the second aspect can be expected.

According to a ninth aspect of the present invention, the server as described in the seventh or eighth aspect further includes: a unit configured to accept from a user an input of a rate of increase of the call volume and a rate of decrease in effect thereof on the call volume, in association with a date of the event, for an event that causes an increase or a decreases in the call volume; and a unit configured to adjust the call volume that is calculated, based upon the rate of increase and the rate of decrease thus accepted.

According to such a configuration, by operating the server, an effect similar to that described in the third aspect can be expected.

According to a tenth aspect of the present invention, the server as described in the ninth aspect further includes: a unit configured to accept from a user an input of magnitude data that indicates a magnitude of the event, in association with identification data of the event; and a unit configured to adjust the rate of increase based upon the magnitude data thus accepted.

According to such a configuration, by operating the server, an effect similar to that described in the fourth aspect can be expected.

According to an eleventh aspect of the present invention, the server as described in the ninth or tenth aspect further includes a unit configured to calculate the rate of increase and the rate of decrease based upon a past record of the event.

According to such a configuration, by operating the server, an effect similar to that described in the fifth aspect can be expected.

According to a twelfth aspect of the present invention, in the server as described in any one of the ninth to the eleventh aspect, in a case where a plurality of events overlap on the same day, the unit configured to accept an input regarding the event accepts a combination of the plurality of events as a single event.

According to such a configuration, by operating the server, an effect similar to that described in the sixth aspect can be expected.

In a thirteenth aspect of the present invention, a program for predicting future call volume in a contact center executes steps of:

storing past record data regarding the call volume by collecting from an exchanger;

classifying the past record data for a predetermined term in the past in accordance with segments: a 7-day period in a month starting from the beginning of a month; a day of the week; and a predetermined period of time in a day;

obtaining a multiple regression equation having the call volume as an objective variable, based upon the past record data thus classified, by performing a multivariate analysis for each day of the week; and calculating the call volume in a term that is specified by a user based upon the multiple regression equation.

According to such a configuration, by executing the program on the server, an effect similar to that described in the first aspect can be expected.

According to a fourteenth aspect of the present invention, in the step of classifying in the program as described in the thirteenth aspect, a first day after a holiday and Mondays are classified in the same segment and public holidays and Sundays are classified in the same segment.

According to such a configuration, by executing the program on the server, an effect similar to that described in the second aspect can be expected.

According to a fifteenth aspect of the present invention, the program as described in the thirteenth or fourteenth aspect further executes steps of: accepting from a user an input of a rate of increase of the call volume and a rate of decrease in effect thereof on the call volume, in association with a date of the event, for an event that causes an increase or a decrease in the call volume; and adjusting the call volume that is calculated, based upon the rate of increase and the rate of decrease thus accepted.

According to such a configuration, by executing the program on the server, an effect similar to that described in the third aspect can be expected.

According to a sixteenth aspect of the present invention, the program as described in the fifteenth aspect further executes steps of: accepting from a user an input of magnitude data that indicates a magnitude of the event, in association with identification data of the event; and adjusting the rate of increase based upon the magnitude data thus accepted.

According to such a configuration, by executing the program on the server, an effect similar to that described in the fourth aspect can be expected.

According to a seventeenth aspect of the present invention, the program as described in the fifteenth or the sixteenth aspect further executes a step of calculating the rate of increase and the rate of decrease based upon a past record of the event.

According to such a configuration, by executing the program on the server, an effect similar to that described in the fifth aspect can be expected.

According to an eighteenth aspect of the present invention, in the step of accepting an input regarding the event in the program as described in any one of the fifteenth to seventeenth aspects, in a case where a plurality of events overlap on the same day, a combination of the plurality of events is accepted as a single event.

According to such a configuration, by executing the program on the server, an effect similar to that described in the sixth aspect can be expected.

Effects of the Invention

According to the present invention, call volume can be predicted by a multivariate analysis using an explaining variable with high prediction accuracy, and the call volume thus predicted can be adjusted in consideration of an effect of an event that causes an increase or a decrease in call volume.

BRIEF DESCRIPTION OF THE DRAWINGS

FIG. 3 is a diagram illustrating a notion of a week, which is one variable according to an example of a preferred embodiment of the present invention;

FIG. 4 is a diagram illustrating a notion of a week, which is one variable according to an example of a preferred embodiment of the present invention;

FIG. 5 is a diagram illustrating a notion of a day of the week, which is one variable according to an example of a preferred embodiment of the present invention;

FIG. 9 is a diagram showing an event table according to an example of a preferred embodiment of the present invention;

FIG. 10 is a diagram showing an event occurrence table according to an example of a preferred embodiment of the present invention;

FIG. 11 is a diagram showing a display example of an event reference window according to an example of a preferred embodiment of the present invention;

FIG. 12 is a diagram showing a display example of an event registration window according to an example of a preferred embodiment of the present invention;

FIG. 14 is a diagram showing explaining variables used in a multiple regression analysis and possible values thereof according to an example of a preferred embodiment of the present invention;

FIG. 16 is a diagram showing a correlation between a past record value and a sample score as a result of a multiple regression analysis in Example 1 regarding an example of a preferred embodiment of the present invention;

PREFERRED MODE FOR CARRYING OUT THE INVENTION

An example of a preferred embodiment of the present invention is described hereinafter with reference to the drawings.

System Outline

Figure 1:
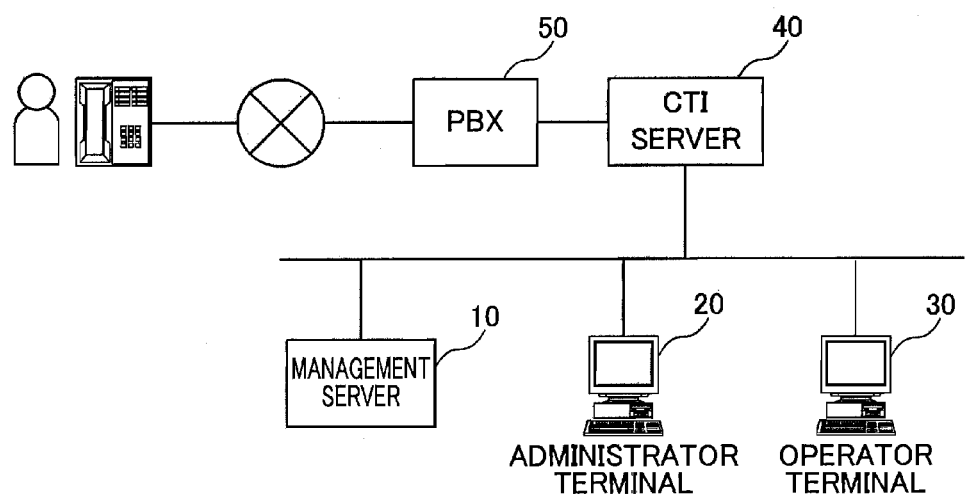
FIG. 1 is a diagram showing an outline of a contact center system according to an example of a preferred embodiment of the present invention.

FIG. 1 is a diagram showing an outline of a contact center system according to an example of a preferred embodiment of the present invention.

In a contact center, a call from a customer is received by a PBX (Private Branch eXchange) 50 and a CTI (Computer Telephony Integration) server 40, and is connected to an operator telephone or an operator terminal 30 that is on standby.

In order to allocate an appropriate number of operators for handling calls, an administrator has to predict future call volume. In this case, a management server 10 calculates prediction data of call volume in a term that is specified, based upon past record data obtained from the CTI server 40 and input data accepted from the administrator via an administrator terminal 20 and displays on the administrator terminal 20.

Server Configuration

Figure 2:
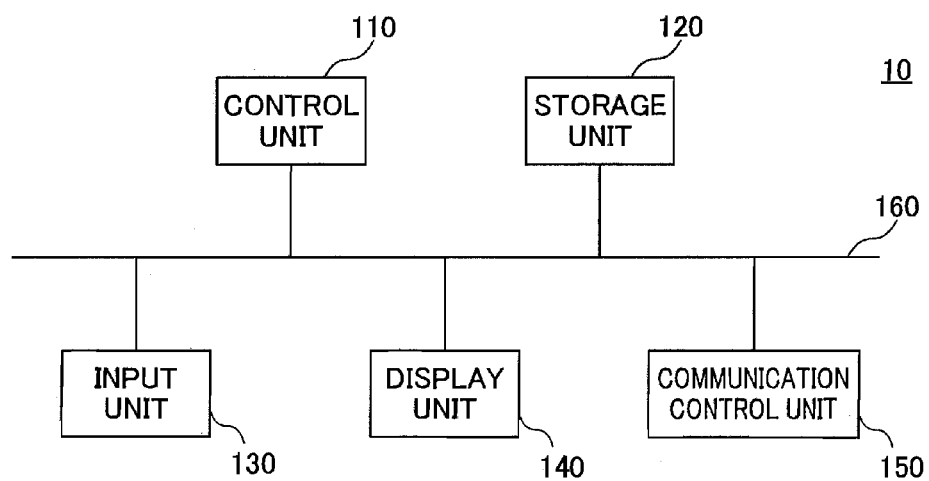
FIG. 2 is a block diagram showing a configuration of a management server 10 according to an example of a preferred embodiment of the present invention.

FIG. 2 is a block diagram showing a configuration of a management server 10 according to an example of a preferred embodiment of the present invention.

A control unit 110, a storage unit 120, an input unit 130, a display unit 140, and a communication control unit 150 are connected to each other via a bus 160.

The control unit 110, which is an information processor (CPU) for computing and processing information, controls the overall management server 10. The control unit 110 reads and executes various programs stored in the storage unit 120 accordingly, thereby cooperating with the abovementioned hardware and implementing various functions according to the present invention.

The storage unit 120 may include local memory used for executing the programs in combination with the control unit 110, a large capacity bulk memory, and cache-memory used for efficiently searching in the bulk memory. An example of a computer readable medium that constitutes the storage unit 120 can include media that electrically, magnetically, optically, and electromagnetically realize the storage unit 120. More specifically, included are a semiconductor memory device, a magnetic tape, a magnetic disk, random-access memory (RAM), read-only memory (ROM), and an optical disk.

The input unit 130 is a means for accepting an input by a user, which may include a keyboard, a pointing device, and the like. The input unit 130 can be directly connected to the management server 10, or through an I/O controller.

The display unit 140 is a means for displaying a window on which an input of data is accepted for the user, and a window of a result of arithmetic processing by the management server 10, which may include a display device such as a cathode-ray tube (CRT), a liquid crystal display device (LCD), and the like. The display unit 140 can be directly connected to a computer, or via an I/O controller.

The communication control unit 150 is a network adapter that allows the computer to connect with another arithmetic processing system or a storage device via a dedicated network or a public network. The communication control unit 150 may include a modem, a cable modem, and an Ethernet (registered trademark) adapter.

Explaining Variable

A notion of a week, which is one variable according to an example of a preferred embodiment of the present invention, is explained hereinafter with reference to FIGS. 3 and 4.

Generally, as with a first week 61*a*, a second week 62*a*, and a third week 63*a* such as in FIG. 3, weeks are counted in accordance with lines in a calendar; however, in the present embodiment, as with a first week 61*b* and a second week 62*b* in FIG. 4, weeks are 7-day periods from the beginning of a month.

In this case, for example, a first Monday is the fifth in the second week in FIG. 3; however, the fifth is in the first week in FIG. 4. Similarly, all the days of the week first appear in the first week. Accordingly, for example, periodical change in call volume in a schedule, such as of the first Monday and the like, can be reflected, thereby providing higher prediction accuracy.

Next, a notion of a day of the week, which is one variable according to an example of a preferred embodiment of the present invention, is explained hereinafter with reference to FIG. 5.

In a month shown in FIG. 5, the seventeenth is a holiday. In this case, where the seventeenth is generally classified as Monday, the seventeenth is classified in the same segment as Sunday in the present embodiment. In addition, the eighteenth is generally classified as Tuesday; however, in the present embodiment, the eighteenth is classified in the same segment as Monday as a day after a holiday.

As a result, holidays and the day after a holiday can be classified more practically, and, as a result, irregularity in a cycle in the week due to the holidays can be absorbed, thereby improving prediction accuracy.

Effect of Events

Figure 6:
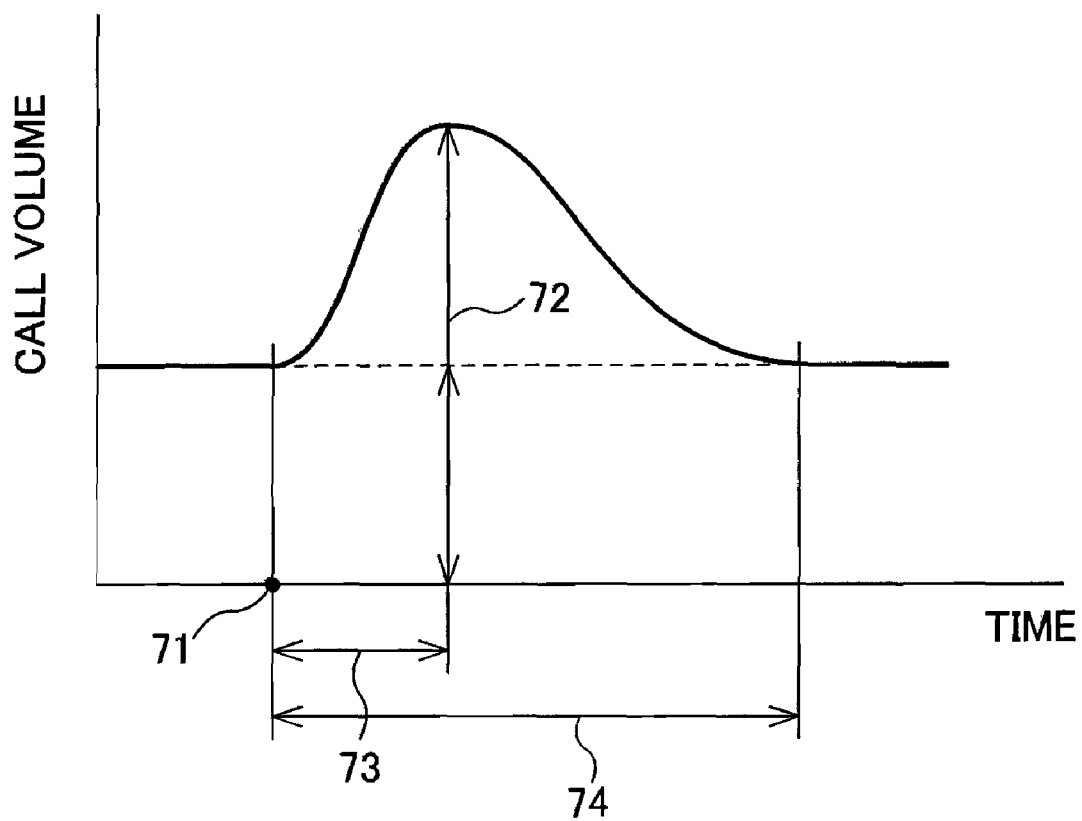
FIG. 6 is a diagram showing a change in call volume by an event according to an example of a preferred embodiment of the present invention.

FIG. 6 is a diagram showing a change in call volume by an event according to an example of a preferred embodiment of the present invention.

Call volume in a contact center can be predicted to increase in response to events such as newspaper advertisement. Increase in the call volume and degree of decrease thereafter over time are applied to a predetermined model.

For example, call volume is maximized when a time 73 elapses from a time point 71 where an event occurs. Thereafter, when a time 74 elapses, the call volume returns to a state before the event or a state of being increased by a predetermined proportion.

In the present embodiment, a model is obtained by using a rate of increase and a rate of decrease. The rate of increase is represented by, for example, a proportion 72 of increase in call volume. The rate of decrease is represented by, for example, logarithmic decrement, the time 74 and the like. In addition, these can be combined with the time 73.

Furthermore, regarding the rate of decrease, an input of a degree of decrement in call volume can be accepted for each day after the day of the event. According to such a configuration, a predicted call volume for each day can be adjusted even with an atypical change that cannot be modeled with a predetermined function and the like.

It should be noted that the rate of increase and the rate of decrease are to be registered for each event and, for example, can be set by accepting an input of selection from a plurality of model cases that is registered in advance.

In addition, an effect of events on call volume can be obtained by, not limited to modeling using the rate of increase and the rate of decrease, other well-known methods that can express a degree of the effect.

Main Processing

Figure 7:
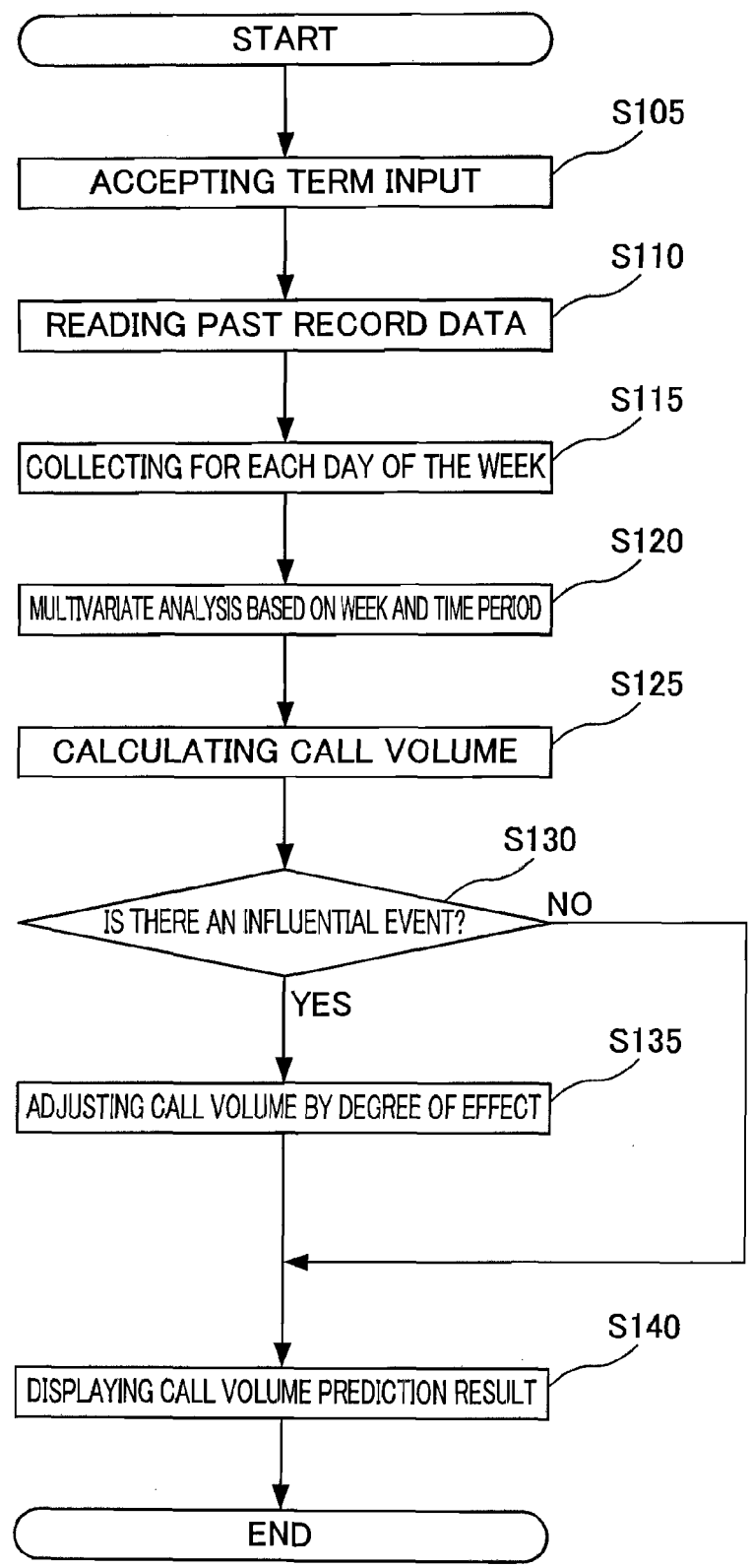
FIG. 7 is a diagram showing a flow of main processing according to an example of a preferred embodiment of the present invention.

FIG. 7 is a diagram showing a flow of main processing according to an example of a preferred embodiment of the present invention. The management server 10 predicts call volume by this processing.

In Step S105, the control unit 110 accepts an input of a term from a user. More specifically, for example, an input from a user to an input form displayed on the administrator terminal 20 is accepted via the communication control unit 150, thereby setting a term subject to a prediction and a term for past record data used for the prediction.

In Step S110, the control unit 110 reads the past record data of call volume, according to the term being set in Step S105. The past record data is received from the CTI server 40 and stored in the storage unit 120.

In Step S115, the control unit 110 tallies up the past record data, being read in Step S110, for each day of the week. Here, the days of the week are defined, as described above, such that holidays and Sundays are in the same segment and a day after a holiday and Mondays are in the same segment.

In Step S120, the control unit 110 performs a multivariate analysis using week and time period, for each day of the week, based upon the past record data being tallied up in Step S115. Here, as described above, the week is a 7-day period starting from the beginning of a month, and the time period is, for example, a 1 hour period.

More specifically, a method for the multivariate analysis can be a multiple regression analysis, which is executed with the abovementioned week and the time period as explaining variables thereof. As a result, a multiple regression equation using variables that have a major impact on call volume can be obtained.

In Step S125, the control unit 110 calculates call volume in the term subject to a prediction that is specified, according to the multiple regression equation obtained in Step S120.

In Step S130, the control unit 110 determines whether an event is present that affects call volume in the term subject to a prediction that is specified. More specifically, for example, event information is stored in advance in an event table shown in FIG. 9 and an event occurrence table shown in FIG. 10 in response to an input from a user.

As a result, an event in the term subject to a prediction and an event in a predetermined period of time (a predetermined number of days) therebefore can be extracted.

Here, the event table (FIG. 9) stores the rate of increase and the rate of decrease as a degree of effect on call volume, in association with an ID for identifying an event and a name of the event. It should be noted that the rate of increase is data showing a proportion of increase in call volume due to the event, and the rate of decrease is data showing a model, among models defined in advance, to be used. The rate of decrease can be replaced by logarithmic decrement, time decrease and the like.

The event occurrence table (FIG. 10) stores an occurrence date (year-month-day) of an event and data showing a magnitude thereof, in association with the ID for identifying the event. Here, the data showing a magnitude is, for example, derived from a circulation of newspaper and the like. The rate of increase can be adjusted by being multiplied by the data showing a magnitude.

In Step S135, the control unit 110 adjusts call volume based upon the degree of effect (the rate of increase and the rate of decrease) regarding the event determined in Step S130. As a result, in addition to periodical fluctuation in call volume of every week and every time period, an effect by the event can be considered, thereby providing a more accurate prediction of call volume.

In Step S140, the control unit 110 submits data for display to the administrator terminal 20 in order to display a call volume prediction result that is calculated in Step S135. The administrator terminal 20 displays the result on a screen based upon the data for display. As a result, the administrator can see the call volume prediction result for the term specified and use the result as fundamental data for allocating operators.

Collection of Past Record Data

Figure 8:
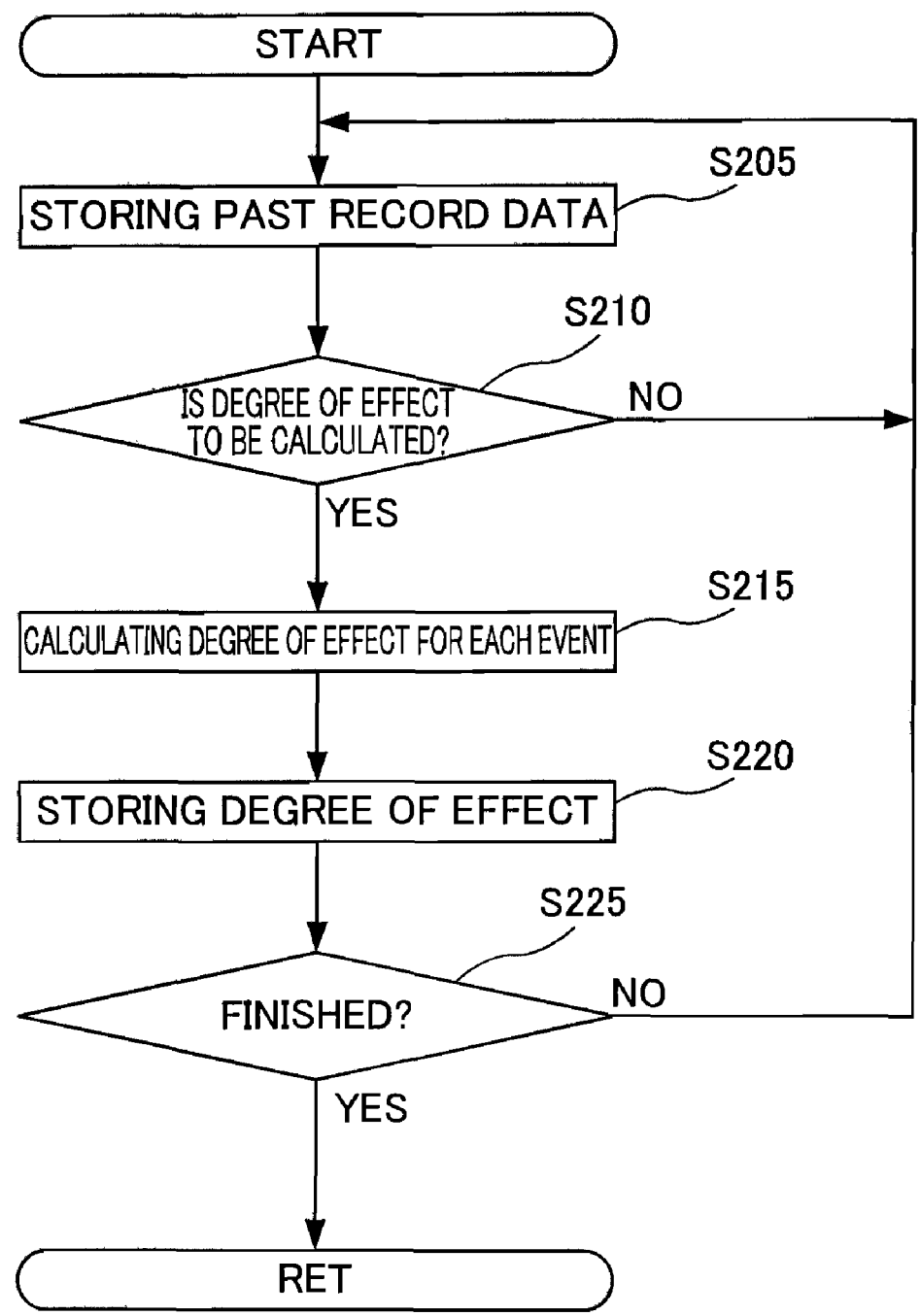
FIG. 8 is a diagram showing a flow of past record data collection processing according to an example of a preferred embodiment of the present invention.

FIG. 8 is a diagram showing a flow of past record data collection processing according to an example of a preferred embodiment of the present invention. In this processing, the management server 10 updates data in the event table (FIG. 9).

In Step S205, the control unit 110 receives past record data of call volume from the CTI server 40 and stores in the storage unit 120.

In Step S210, the control unit 110 determines whether a degree of effect by an event is to be calculated or not. In a case where the degree of effect is not to be calculated, the control unit 110 repeats Step S205 and accumulates past record data. On the other hand, in a case where the degree of effect is to be calculated, a calculation can take place in a predetermined cycle and a practical degree of effect can be stored by updating periodically.

In Step S215, the control unit 110 calculates a degree of effect of each event on call volume. More specifically, for example, past record data in a predetermined period of time from a date in the event occurrence table (FIG. 10) is read, a change in call volume is referenced, and the rate of increase and the rate of decrease are determined.

In Step S220, the control unit 110 stores the degree of effect (the rate of increase and the rate of decrease), which is calculated in Step S215, to the storage unit 120. More specifically, by updating the event table (FIG. 9), the degree of effect is used from next call volume prediction processing (the main processing, FIG. 7).

In Step S225, the control unit 110 determines whether the present processing is to be terminated or not. More specifically, for example, in a case where an administrator does not input a termination instruction, the processing is returned to Step S205 and continues collecting the past record data.

By way of the abovementioned processing, the management server 10 can automatically store a practical degree of effect regarding a change in call volume due to various events by collecting past record data.

Window Display Example

FIG. 11 is a diagram showing a display example of an event reference window according to an example of a preferred embodiment of the present invention.

In the display example, an event that affects call volume is shown in association with a calendar, for each target queue (service or campaign) in a contact center. In a table in a lower row, a list of events is shown for each day. Corresponding dates are indicated in different colors in a calendar in an upper row.

Both on January 9 and February 16, an event "Advertisement in XX Journal" occurs; however, an effect level is 100% and 95%, respectively, in other words, an increase in call volume on February 16 is 5% less than that on January 9.

A user can add an event to the list by new event registration, or update data regarding events by correcting and deleting. FIG. 12 is a diagram showing a display example of an event registration window according to an example of a preferred embodiment of the present invention.

According to FIG. 12, the effect level (corresponding to the magnitude in FIG. 10) of the event "Advertisement in XX Journal" is 100%. Here, the effect level can also be automatically calculated based upon a scale of the event (a circulation of newspaper and the like).

In addition, the rate of decrease is, with 100% being the increase in call volume on the very day of the event, 90% on the first day thereafter, 80% on the second day thereafter, and 0% on the tenth day thereafter, in other words an unaffected state. Here, a period for which the rate of decrease can be input is not limited to 10 days, and the period can be made adjustable.

It should be noted that, as described above, the rate of decrease can be input in a form of a coefficient with respect to the model, such as logarithmic decrement, decrease time and the like, or selection data from among a plurality of model types.

The management server 10 updates the event table (FIG. 9) and the event occurrence table (FIG. 10), by receiving such data from the administrator terminal 20.

Figure 13:
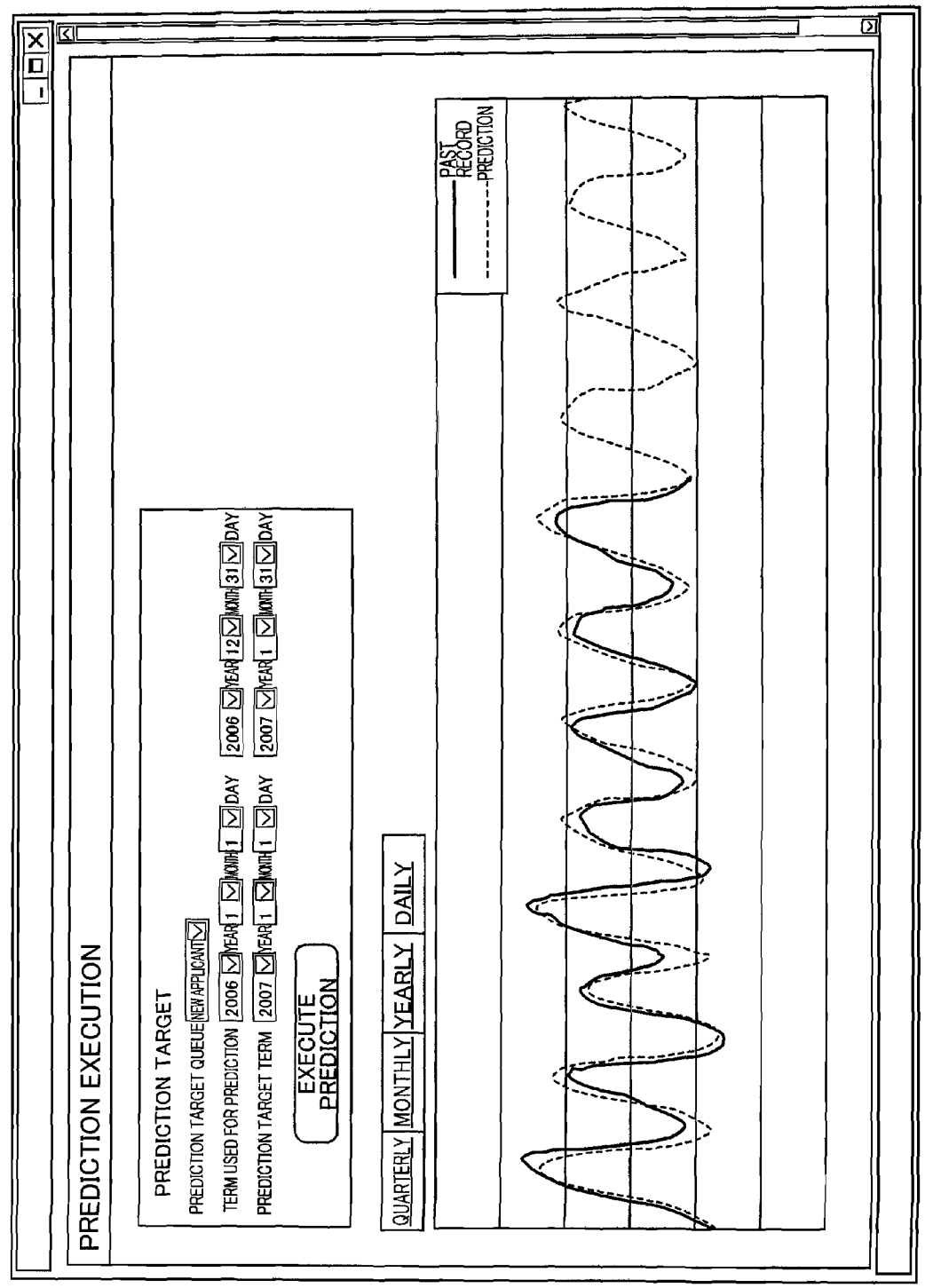
FIG. 13 is a diagram showing a display example of a call volume prediction result according to an example of a preferred embodiment of the present invention.

FIG. 13 is a diagram showing a display example of a call volume prediction result according to an example of a preferred embodiment of the present invention.

An input of a term used for prediction and a term subject to the prediction is accepted for each prediction target queue, and a call volume prediction result is displayed in the chart in a lower row in response to an input of prediction execution instruction. Here, past record data and predicted data are displayed overlapping each other in the chart and, in a term where the past record data is not displayed, future predicted data is displayed.

It should be noted that a mode of display is not limited thereto. A term displayed can be extended or shortened, and units for plotted data (per day or per hour) can be made adjustable.

EXAMPLES

Example 1 of a call volume prediction according to an example of a preferred embodiment of the present invention is described hereinafter with reference to FIGS. 14 to 21.

FIG. 14 is a diagram showing explaining variables (item names) used in a multiple regression analysis and possible values (category names) thereof. In Example 1, weeks and time periods are the explaining variables. As Comparative Examples 1 to 4, examples are shown where the explaining variables are "week, day of the week in consideration of holidays, time period", "day of the month, day of the week in consideration of holidays, time period", "day of the month, day of the week without consideration of holidays, time period", and "type of day of the month (ending in 5 or 0 or not), type of day of the week (weekdays or holidays), time period", respectively.

For Example 1 and Comparative Examples 1 to 4, predicted data (sample score) is calculated by a multiple regression equation that is obtained based upon past record data for each time period from a three-month period, and a difference from the past record data is examined.

Figure 15:
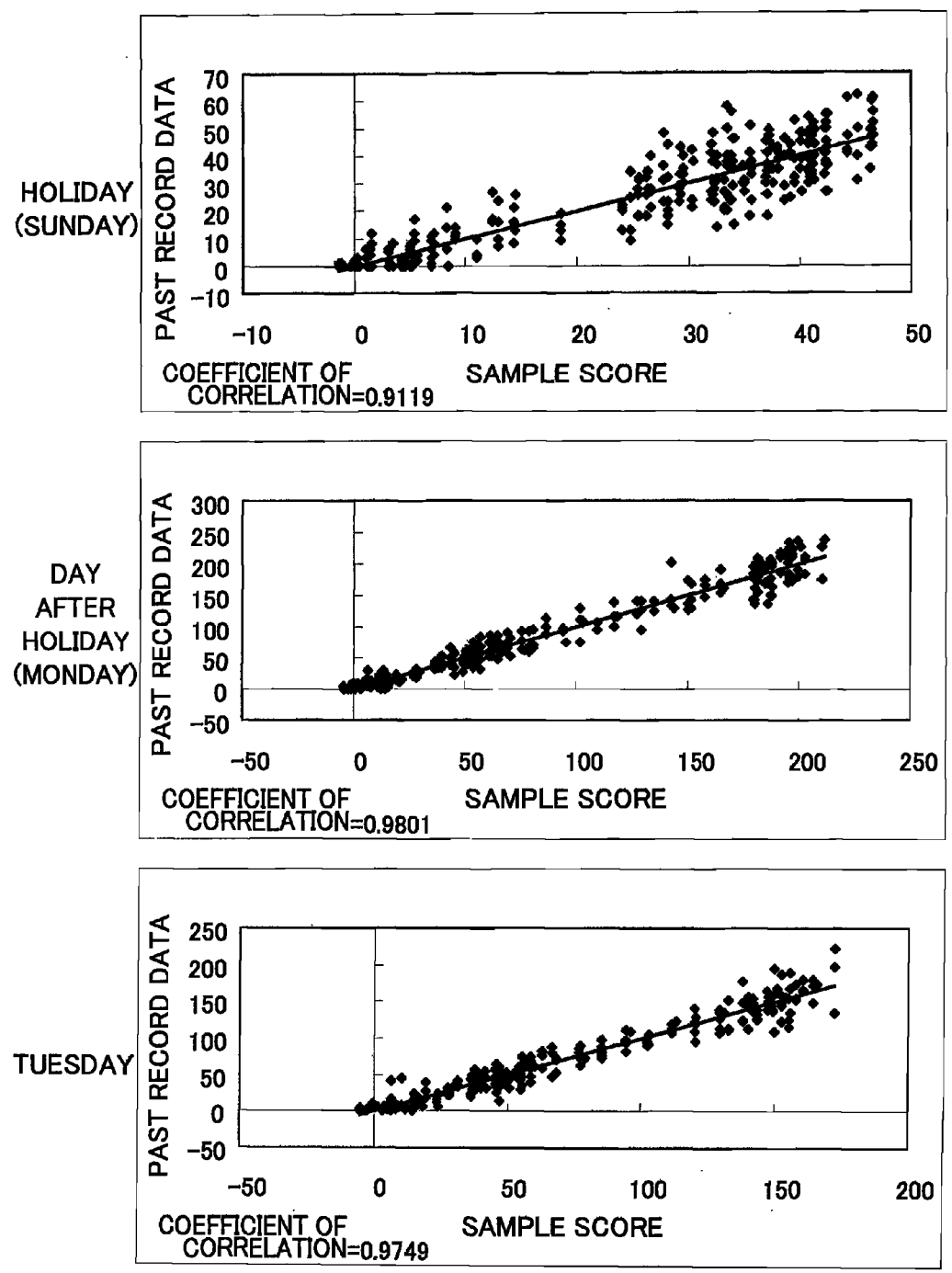
FIG. 15 is a diagram showing a correlation between a past record value and a sample score as a result of a multiple regression analysis in Example 1 regarding an example of a preferred embodiment of the present invention.
Figure 17:
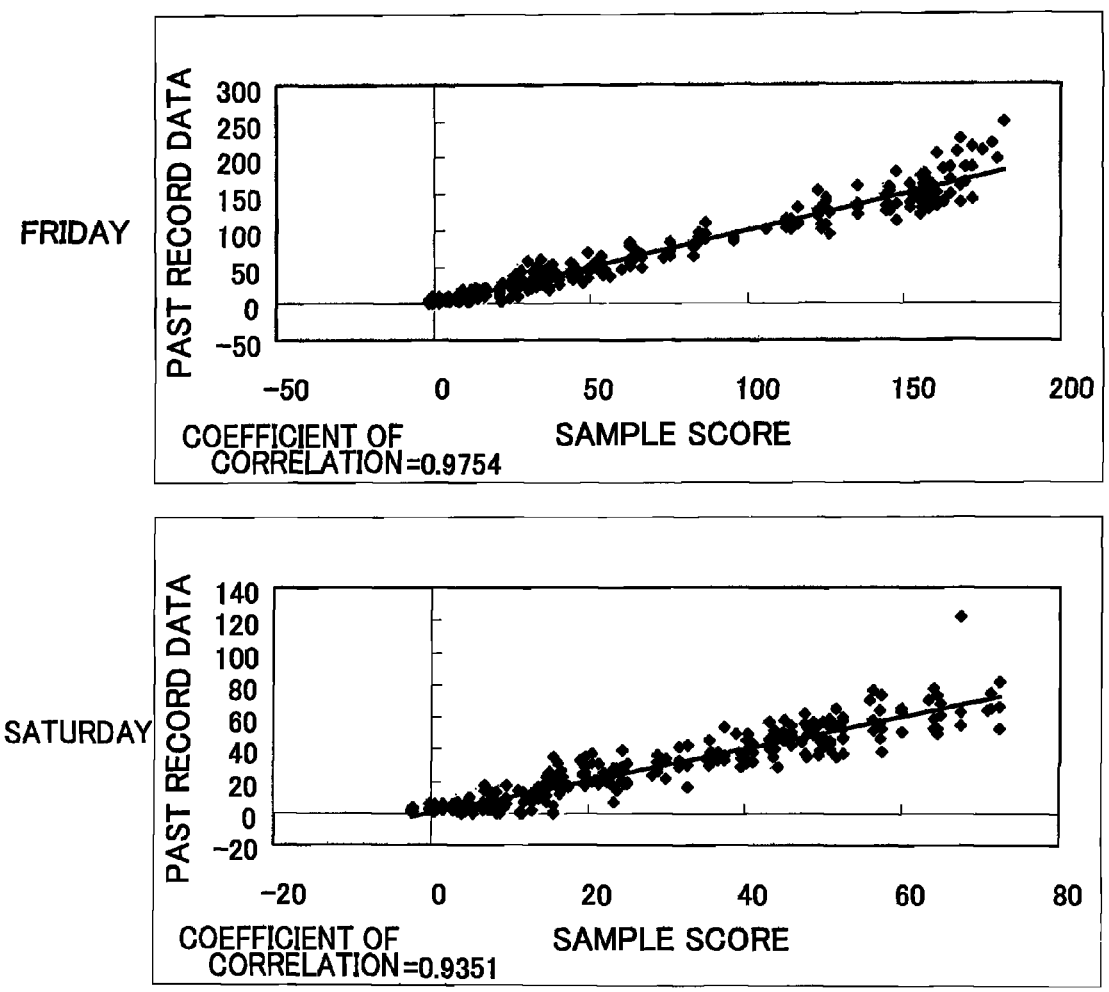
FIG. 17 is a diagram showing a correlation between a past record value and a sample score as a result of a multiple regression analysis in Example 1 regarding an example of a preferred embodiment of the present invention.
Figure 18:
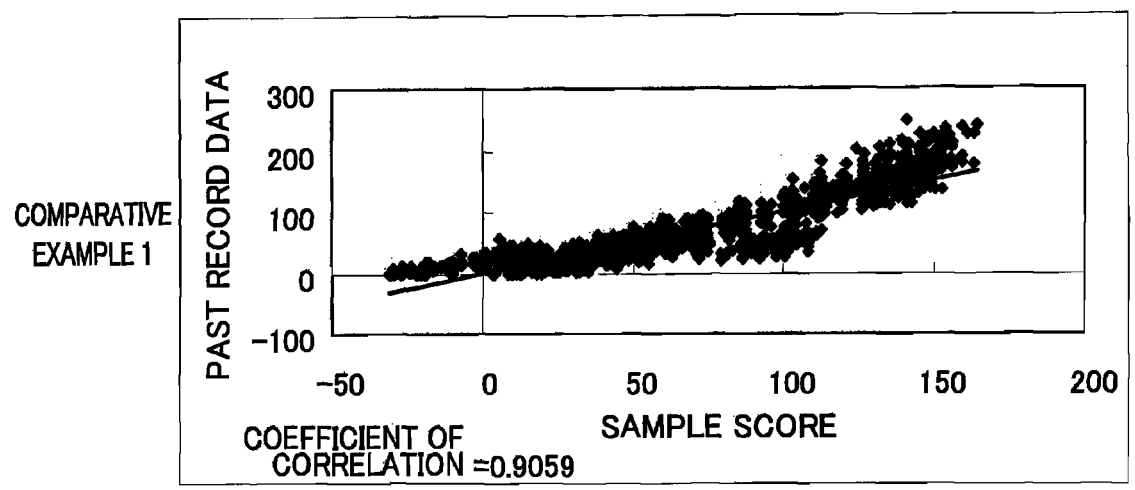
FIG. 18 is a diagram showing a correlation between a past record value and a sample score as a result of a multiple regression analysis in Comparative Example 1 regarding an example of a preferred embodiment of the present invention.
Figure 19:
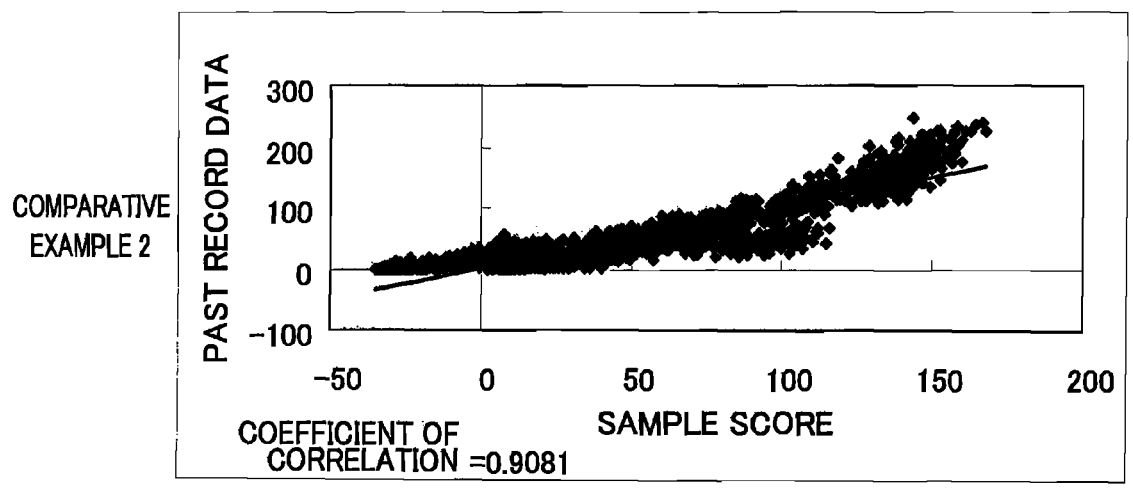
FIG. 19 is a diagram showing a correlation between a past record value and a sample score as a result of a multiple regression analysis in Comparative Example 2 regarding an example of a preferred embodiment of the present invention.
Figure 20:
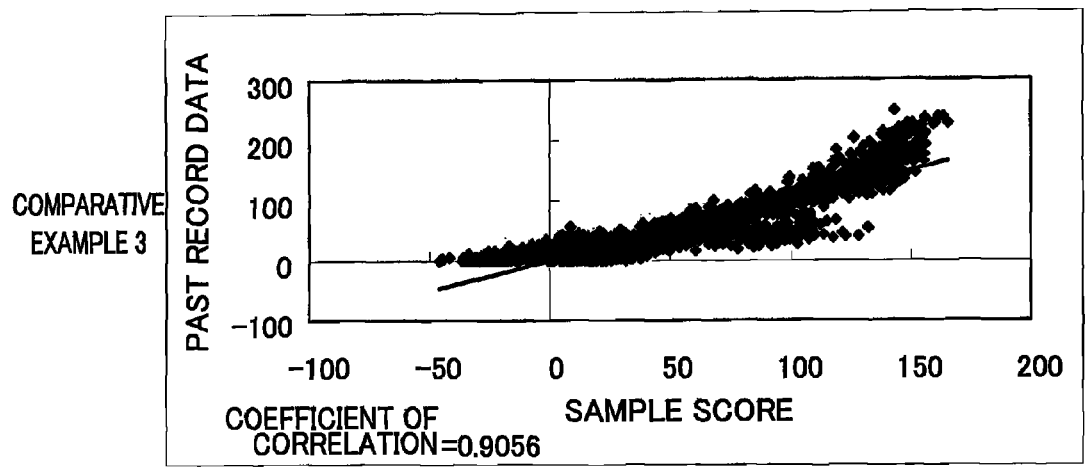
FIG. 20 is a diagram showing a correlation between a past record value and a sample score as a result of a multiple regression analysis in Comparative Example 3 regarding an example of a preferred embodiment of the present invention.
Figure 21:
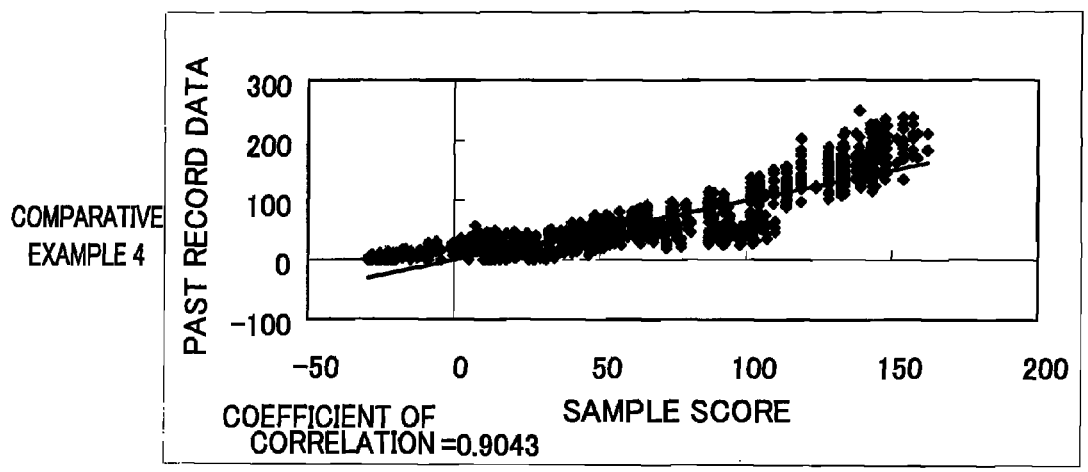
FIG. 21 is a diagram showing a correlation between a past record value and a sample score as a result of a multiple regression analysis in Comparative Example 4 regarding an example of a preferred embodiment of the present invention.

FIGS. 15, 16, and 17 are diagrams showing a correlation between a past record value and a sample score as a result of a multiple regression analysis in Example 1. Coefficients of correlation for each day of the week in consideration of holidays are high as 0.9119 to 0.9830, which shows that the prediction is highly accurate.

FIGS. 18, 19, 20 and 21 are diagrams showing correlation as a result of Comparative Examples 1, 2, 3 and 4 respectively, as that of Example 1. Coefficients of correlation are lower than that of Example 1, being 0.9059, 0.9081, 0.9056, and 0.9043, respectively. This also shows that a method of Example 1 calculates predicted data that is closer to the past record data than Comparative Examples 1 to 4, and thus can make a more effective prediction.

Although a preferred embodiment of the present invention has been described above, the present invention is not limited thereto. In addition, the effects described in the embodiment of the present invention simply list the most preferable effects derived from the present invention, and the effects of the present invention are not limited to the effects described in the embodiment of the present invention.

The invention claimed is:

1. A method of predicting future call volume in a contact center, the method comprising steps of:
    storing, using a computing device, past record data regarding the call volume by collecting from an exchanger;
    classifying, using the computing device, the past record data for a predetermined term in the past in accordance with segments: a 7-day period in a month starting from the beginning of a month; a day of the week; and a predetermined period of time in a day;
    obtaining, using the computing device, a multiple regression equation having the call volume as an objective variable, based upon the past record data thus classified, by performing a multivariate analysis for each day of the week;
    calculating, using the computing device, the call volume in a term that is specified by a user based upon the multiple regression equation;
    accepting, using the computing device, from a user an input of a rate of increase of the call volume and a rate of decrease in effect thereof on the call volume, the rate of increase and the rate of decrease associated with a date of at least one event that causes an increase or a decrease in the call volume, wherein a combination of a plurality of events overlapping on the same date is accepted as a single event; and
    adjusting, using the computing device, the call volume that is calculated, based upon the rate of increase and the rate of decrease thus accepted.

2. The method according to claim 1, wherein a first day after a holiday and Mondays are classified in the same segment and public holidays and Sundays are classified in the same segment.

3. The method according to claim 1, further comprising:
    accepting from a user an input of magnitude data that indicates a magnitude of the event, in association with identification data of the event; and
    adjusting the rate of increase based upon the magnitude data thus accepted.

4. The method according to claim 1, further comprising calculating the rate of increase and the rate of decrease based upon a past record of the event.

5. A server to predict future call volume in a contact center, the server comprising:
    a unit configured to store past record data regarding the call volume by collecting from an exchanger;
    a unit configured to classify the past record data for a predetermined term in the past in accordance with segments: a 7-day period in a month starting from the beginning of a month; a day of the week; and a predetermined period of time in a day;
    a unit configured to obtain a multiple regression equation having the call volume as an objective variable, based upon the past record data thus classified, by performing a multivariate analysis for each day of the week;
    a unit configured to calculate the call volume in a term that is specified by a user based upon the multiple regression equation;
    a unit configured to accept from a user an input of a rate of increase of the call volume and a rate of decrease in effect thereof on the call volume, the rate of increase and the rate of decrease associated with a date of at least one event that causes an increase or a decrease in the call volume, wherein a combination of a plurality of events overlapping on the same date is accepted as a single event; and a unit configured to adjust the call volume that is calculated, based upon the rate of increase and the rate of decrease thus accepted.

6. The server according to claim 5, wherein the classification unit classifies a first day after a holiday and Mondays in the same segment and public holidays and Sundays in the same segment.

7. The server according to claim 5, further comprising:

a unit configured to accept from a user an input of magnitude data that indicates a magnitude of the event, in association with identification data of the event; and a unit configured to adjust the rate of increase based upon the magnitude data thus accepted.

8. The server according to claim 5, further comprising:

a unit configured to calculate the rate of increase and the rate of decrease based upon a past record of the event.

9. A non-transitory computer-readable medium storing a program of instructions to predict future call volume in a contact center, the instructions, when executed by a computing device, cause the computing device to:

store past record data regarding the call volume by collecting from an exchanger;

classify the past record data for a predetermined term in the past in accordance with segments: a 7-day period in a month starting from the beginning of a month; a day of the week; and a predetermined period of time in a day;

obtain a multiple regression equation having the call volume as an objective variable, based upon the past record data thus classified, by performing a multivariate analysis for each day of the week;

calculate the call volume in a term that is specified by a user based upon the multiple regression equation;

accept from a user an input of a rate of increase of the call volume and a rate of decrease in effect thereof on the call volume, the rate of increase and the rate of decrease associated with a date of at least one event that causes an increase or a decrease in the call volume, wherein a combination of a plurality of events overlapping on the same date is accepted as a single event; and adjust the call volume that is calculated, based upon the rate of increase and the rate of decrease thus accepted.

10. The non-transitory computer-readable medium according to claim 9, wherein a first day after a holiday and Mondays are classified in the same segment and public holidays and Sundays are classified in the same segment.

11. The non-transitory computer-readable medium according to claim 9, further comprising instructions that, when executed by the computing device, cause the computing device to:

accept from a user an input of magnitude data that indicates a magnitude of the event, in association with identification data of the event; and adjust the rate of increase based upon the magnitude data thus accepted.

12. The non-transitory computer-readable medium according to claim 9, further comprising instructions that, when executed by the computing device, cause the computing device to calculate the rate of increase and the rate of decrease based upon a past record of the event.

* * * * *